United States Patent
Toong et al.

(12) 
(10) Patent No.: US 6,604,114 B1
(45) Date of Patent: Aug. 5, 2003

(54) SYSTEMS AND METHODS FOR ORGANIZING DATA

(75) Inventors: Hoo-min Toong, Cambridge, MA (US); Joseph G. Hadzima, Jr., Wellesley, MA (US); André Morkel, Somerville, MA (US)

(73) Assignee: Technology Enabling Company, LLC, Cambridge, MA (US)

( * ) Notice: Subject to any disclaimer, the term of this patent is extended or adjusted under 35 U.S.C. 154(b) by 39 days.

(21) Appl. No.: 09/645,626

(22) Filed: Aug. 24, 2000

Related U.S. Application Data

(63) Continuation of application No. 09/454,457, filed on Dec. 3, 1999.
(60) Provisional application No. 60/111,111, filed on Dec. 4, 1998, and provisional application No. 60/111,112, filed on Dec. 4, 1998.

(51) Int. Cl.[7] .............................................. G06F 17/30
(52) U.S. Cl. .................................................. 707/104.1
(58) Field of Search ............................. 707/1, 3, 4, 10, 707/103 R; 705/7; 706/45, 47, 52, 59

(56) References Cited

U.S. PATENT DOCUMENTS

| | | | | |
|---|---|---|---|---|
| 5,802,256 A | * | 9/1998 | Heckerman et al. | 706/45 |
| 5,918,232 A | * | 6/1999 | Pouschine et al. | 707/103 R |
| 6,339,767 B1 | * | 1/2002 | Rivette et al. | 707/1 |

OTHER PUBLICATIONS

Brockhoff, K. K., "Indicators of Firm Patent Activities", Technology Management: the New International Language 27–31 (Oct. 1991), ISBN: 0–7803–0161–7 PP 476–481.

International Search Report, Completed on Feb. 22, 2000 and Mailed on Mar. 17, 2000.

* cited by examiner

*Primary Examiner*—Diane D. Mizrahi
*Assistant Examiner*—Apu Mofiz
(74) *Attorney, Agent, or Firm*—Coley Hoag LLP

(57) ABSTRACT

The software system described processes a user query for information and organizes, analyzes and presents in a graphic representation, the relevant data for the user, allowing the user to immediately and intrinsically infer the existence of relationships and trends that would normally not have been apparent otherwise. This method supports decision making to an improved level and is capable of presenting data relationships across multiple planes and accessing dissimilar data sets. The ability to then access the underlying data is also disclosed.

20 Claims, 4 Drawing Sheets

RADIO FREQUENCY POLYMERIZATION: USE OF RADIO WAVES TO HEAT MONOMERS AND DRIVE CONDENSATION POLYMERIZATION

| | RADIO AND FREQUENCY | RADIO AND WAVE | POLYMER* | CONDENS* | CONDENS* AND POLYMER* | NYLON | HEAT* |
|---|---|---|---|---|---|---|---|
| RADIO AND FREQUENCY | | | | | | | |
| RADIO AND WAVE | | | | | | | |
| POLYMER* | | | | | | | |
| CONDENS* | | | | | | | |
| CONDENS* AND POLYMER* | | | | | | | |
| NYLON | | | | | | | |
| HEAT* | | | | | | | |

Fig. 2

SYSTEMS AND METHODS FOR ORGANIZING DATA

REFERENCE TO RELATED APPLICATIONS

This application claims priority to and is a continuation of U.S. patent application Ser. No. 09/454,457 filed Dec. 3, 1999, which claims priority to U.S. Provisional Application Ser. No. 60/111,111 filed Dec. 4, 1998 entitled Intellectual Property System, and U.S. Provisional Application Ser. No. 60/111,112 filed Dec. 4, 1998 entitled Intellectual Property System, all of which identify Hoo-Min Toong as an inventor, and all of which are hereby incorporated herein by reference.

FIELD OF THE INVENTION

The invention relates to systems and methods for organizing information, and more particularly to systems and methods that graphically depict information in an organized format.

BACKGROUND OF THE INVENTION

As advances in both computers and the Internet continue, the abundance of data and access to it can be overwhelming at times. While the ability to access this data is limited only by the computer one owns, turning it into useful knowledge is a very different problem. While more and more data is produced and available for use, processing methods which turn data into knowledge have lagged behind. Whole industries have developed centered around search engines simply to scour the internet for data on everything from apples to zoos and more. However even these methods fall short of providing knowledge, at best they return a listing of items that require Human decision making to refine the search further. Only after additional attempts at searching, each time refining the set of keywords or methods employed, does the searcher begin gain knowledge as to the most optimal method to obtain the information required.

In cases where data items are interrelated, the difficulty of transforming the data into useful knowledge increases significantly and is even a more difficult problem than above. In most cases when dealing with data, people tend to view data relationships one-dimensionally, most often as a listing of items, some examples include: hits for web pages based upon a set of keywords, a phonebook of names, product listings, US patents issued. In each of the above cases the data is categorized under similar groupings, similar data items are combined in the same group.

To move beyond the one-dimensional nature of utilizing data, traditional approaches employed to help one make sense of data for decision making have been to construct a model and then try to fit the data to the model. One of the more useful and successful models which accomplishes this is the simple organizational chart which shows individuals in an organization and their relationships in reporting structure. The additional dimension of reporting relationships transforms the one-dimensional list of individuals to a very useful image which represents not only the individuals but the relationships of the individuals to each other. An additional example of a two dimensional data relationship would be airline routes which show the originating and destination points connected by a curved line which represents the flight connecting those two cities. But data can have multiple relationships both within similar data sets and dissimilar data sets. Building models for these situations in order to transform the data into knowledge useful for high-level and strategic decision making is significantly more difficult. In these cases one needs to know the landscape, be part of it, until now this was difficult at best for the three-dimensional case and nonexistent for dimensions beyond.

With the widespread availability of data and more powerful computer technology, being successful at defining relationships of voluminous complex interrelated data on multiple levels in a timely manner is now possible with the method/software disclosed. The software system described herein organizes, analyzes and presents in an optimized fashion a comprehendiable graphic representation of the available data allowing the user to immediately and intrinsically infer the existence of relationships and trends that would normally not have been apparent otherwise. This new method supports decision making to a level never achieved before and is capable of presenting data relationships across multiple planes and accessing dissimilar data sets.

The FRIDAY system is such a decision support system (Find, Relate, Infer, Discover, Analyze, and Yes to actions) For example, if a decision has to be made to invest in a particular opportunity/technology, FRIDAY can greatly enhance the evaluation of intellectual property that surrounds the technology that exists in patent, published paper, and prior art form. FRIDAY can also find business data and the relationships that exist relevant to the opportunity, relate that to the intellectual property data and then to other relevant facts (such as market issues, competition, economic activity, etc.). Having developed the 'landscape' for this particular technology the system can then infer specific important trends that have direct relevance to the opportunity.

From a programmer's perspective, the FRIDAY system is a collection of targeted databases with powerful data retrieval, data correlation and data connection attributes, and unique inference and business communication capabilities. From a user's perspective FRIDAY is a user-friendly system that can sort, analyze, and make sense of data from many different expertise areas and then correlate this data to help illustrate relationships and graphically represent trends of importance that can help in drawing conclusions or supporting actions.

As an example, the existence of patents is becoming increasingly important as businesses place increasingly more value on intellectual capital. Most companies pursue patents to maintain or improve their competitive position. However the standard benchmark for most if not all of these companies is simply the number of patents possessed, a one-dimensional measure. Some of the more progressive companies may go a step further a begin to utilize additional information such as who are the most prolific inventors in order to determine their key contributors to the organization, which is a different measure but still nevertheless one-dimensional. Some two-dimensional measures that companies are beginning to tap is in the area of licensing opportunities. An example of this is IBM approach, IBM possessor of numerous patents, has recognized that the patents owned by them (one-dimensional) when assessed against others patents may yield connections resulting in patents which incorporate a significant portion of the art represented in IBM owned patents, which to IBM can equate to significant licensing opportunities. While our software system can accomplish this with algorithms more effectively and efficiently, it can go beyond and relate other data items such as the company's products related to these patents and/or the inventors associated with the patents and the companies these inventors were employed at before their present company and the patents that were assigned to these companies.

There are also other areas where this software can be applied, as an example tracking major sports figures and the teams they played on over the life of their career is an example of a three-dimensional mapping easily performed by our system, adding their salaries at each point in time is also possible, or for that matter any of their stats.

This software system can also be applicable in the financial sector, where many financial measures can be combined to illustrate trends and relationships that would normally not be apparent by looking at them individually.

To the authors knowledge there is not another system that currently attempts to coherently correlate data from an arbitrary set of separate domains in such an optimized graphical representation.

SUMMARY OF THE INVENTION

The software system described herein organizes, analyzes and presents in an optimized fashion a comprehendable graphic representation of the available data allowing the user to immediately and intrinsically infer the existence of relationships and trends that would normally not have been apparent otherwise. This new method supports decision making to a level never achieved before and is capable of presenting data relationships across multiple planes and accessing dissimilar data sets. The ability to then access the underlying data is also disclosed.

More specifically, the invention can include a method for displaying and correlating data records in a visually comprehendible manner so as to effectively communicate relationships amongst data records. The method comprising the steps of defining the input parameters for searching, said input parameters being dependent on the data and descriptive of the fields in a data record, searching databases comprised of said data records using said input parameters as filters to identify associated data records, capturing associated data from said databases to create the working set containing a unique set of data records, augmenting the working set and performing additional processing to determine connections amongst the data records in the working set and other data records to identify relationships between the data records and the working set and bring to light additional information and knowledge that illustrate and infer relationships not readily apparent from the data records alone, presenting the combined and processed data records in an graphical fashion relative to a time axis to create an expanded display set depicting relationships indicated by connections which allow for communication of issues related to planning, assessment, and implementation, where said connectors are lines calculated and placed to minimize amount of crossing and length which connect the data records represented by a single geometric shape and wherein each shape is placed to minimize overlapping and total space required, where said time axis is scalable throughout the entire time range and independently scalable across and within multiple sub-time ranges and any of the various search parameters may be represented in a number of various methods by employing the use colors, shapes, and/or patterns allowing one to communicate additional information and further distinguish the display set.

The methods also include a step where the presentation of the expanded display set is dynamic such that additional information about a particular data record can be obtained by double clicking the shape to bring one directly to the original data source to enable viewing of additional information related to the data item in question. Additionally, the user has the ability to direct the algorithm to the primary or any number of alternate data sources that may exist for the additional information. Moreover, a hypothetical data record in a similar format can be added to the working set to determine the relationships of the data to the hypothetical entry and to determine the effects and relationships the hypothetical entry has on the data where said hypothetical data item is distinguished by a unique color and/or shape.

Once the set is defined, secondary functional algorithms may be run on the display set to determine areas for potential licensing opportunities, where said potential licensing opportunities are determined by a high degree of patents with the same assignee which reference similar art of another assignee which precedes in time the citing patents which are citing it and/or a high degree of similarity as determined by natural language searching amongst patents with different assignees which may or may not cite the patent which proceeds it.

BRIEF DESCRIPTION OF THE DRAWINGS

The foregoing and other objects and advantages of the invention will be appreciated more fully from the following further descriptions thereof with reference to the accompanying drawings wherein;

FIG. 2 depicts one example of a key grid for identifying a working set of documents;

DETAILED DESCRIPTION OF THE ILLUSTRATED EMBODIMENTS

To provide an overall understanding of the invention, certain illustrated embodiments will now be described including systems and methods for organizing data, and for identifying relationships between data element, to provide a graphical representation of a data set and the relationship between the data elements within the data set. In one particular embodiment, a system will be described for organizing a data set that includes a plurality of data elements each of which represent a Patent Application. The systems and methods described herein will organize the Patent publication to create a graphical depiction or a Web that shows the different ad publications within the data set and it depicts graphically the relationship between those patents. In one embodiment the graphical depiction is presented as a two dimensional image, however in other embodiments three-dimensional or N-dimensional images or representations are created.

Figure 1:
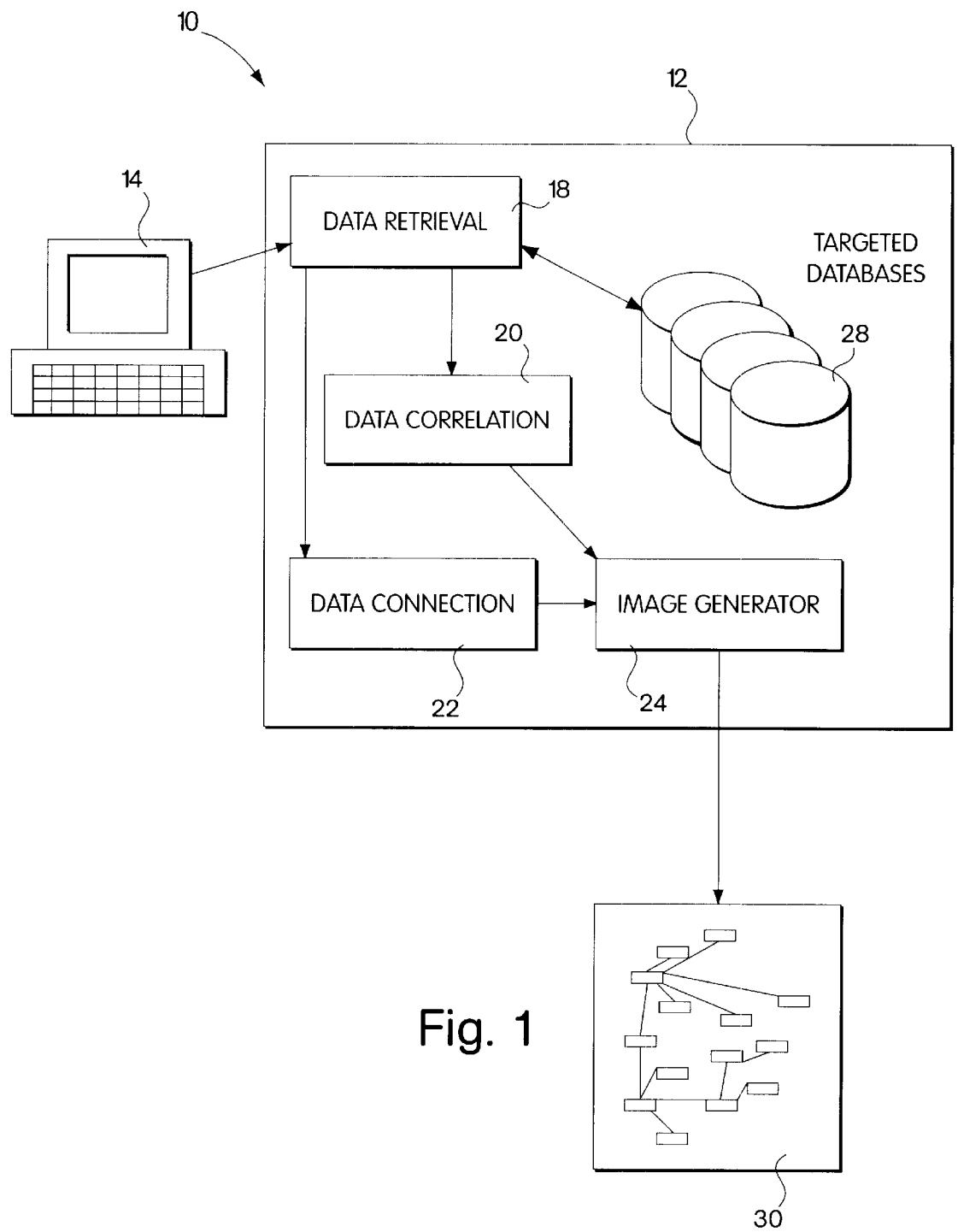
FIG. 1 depicts a functional block diagram of one system according to the invention; for presenting data in an organized format.

FIG. 1 depicts a system 10 for aiding a user and searching through a plurality of data elements to identify a subsection of data elements relevant to a particular interest of the user and for organizing the sub set into a graphical depiction that displays a relationship between the different data elements within the data set selected by the user. Specifically, FIG. 1 depicts a system 10 that includes a data processor element 12 that is coupled to a user terminal 14. The data processor 12 includes a data retrieval mechanism, a data correlation mechanism 20, a data connection mechanism 22, and a image generator 24, and for the depicted embodiment a plurality of targeted databases 28. As further shown by FIG. 1, the system 12 can operate to provide a graphical depiction 30 indicative of the data elements selected by the user and the relationships between the data elements.

The data processing system 12 depicted in FIG. 10 can be any conventional data processing system such as an IBM PC compatible computer running the Windows® operating system, or a sub work station running a Unix operating system. The user monitor applicable device 14 can be a conventional computer monitor and keyboard. In the embodiment depicted by FIG. 10, the user port terminal 14 and the data processor 12 provide the user with a conventional data processing platform that can be employed for searching through a plurality of databases to identify a set of data elements each of which is possibly relevant through to an interest, query, or question of the user. Accordingly, the system 10 can operate as a work station that has been programmed, or include an application program, that allows the user to search through polarity of databases to collect information relevant to a user query. From the information collected in response to the user query, the system 10 can organize an analysis the data elements to provide to the user a graphical depiction on the different data elements collected in certain ones of the relationship between those data elements. This is depicted in FIG. 10 by the graphical depiction of data elements 30. Accordingly, it will be understood that the system 10 allows a user to receive a graphical depiction of the returned data set, and thereby allows the user or easily to do some models of current behavior, and other inferences, and thereby provides the user with improved opportunities for data analysis.

For the database processing element 12, it will be understood that although the data processor 12 is depicted as a functional block diagram, including function block elements such as the data retrieval element 18, the data correlation element 20 and the data connection element 22, it will be understood that the functional block representation provided by FIG. 1 is merely illustrative of the processes operating on the platform 12 and that each of the depicted elements 18 through 24 respectively may be implemented as a computer processes or a single computer process operating on the platform 12. In particular, each of the depicted elements 18 through 24 can be an[d] executing computer process that can be embodied as a computer program such as a C, C++, Fortran, Java, Perl, or other computer language.

The data retrieval element 18 depicted in FIG. 1 includes a database query and set building system of the type commonly employed for allowing a user to build a search query for identifying documents within a database. To this end, the data retrieval element 18 can employ key word searchers to allow the user to employ a key word search, or an iterative process keyword search that builds sequences of keywords in a response to a trail of documents retrieved and reviewed by the user. Such a process is similar to a tree tracing process as subsequent searches narrow and converge upon sets of documents. In one embodiment, the data retrieval element 18 employed keyword grids that assists the system operator or a domain specialist in narrowing down relevant information that may form a working set for the user. A working set may be understood as a set of useful data retrieved from the plurality of targeted databases 28, which can contain information on a variety of different topics. The process for generating a keyword grid is depicted in FIG. 2. Specifically FIG. 2 depicts a keyword grid 40 that can be generated by the data retrieval element 18 in response to a user query, 42. As depicted in FIG. 2 the user query 42 can be a compound user query that includes a plurality of keywords combined together to form a string. The meaning of the string can relate to a topic of interest to the user, and can be employed by the user for identifying documents within the targeted databases 28 of interested of the user.

In one embodiment, the data retrieval element 18 parses the user query 42 to identify a plurality of keyword terms 44 such as those depicted in FIG. 2. As further shown in FIG. 2 the keyword terms 44 can be organized in the grid 40 along a set of horizontal and vertical axes. For example, the user query Radio Frequency polymerization; use of radio waves to heat monomers and drive condensation polymerization.

This user query 42 can be subdivided in a plurality of key terms such as the key terms (radio and frequency); radio and wave; (polimer); (condens*); (condens* and polimer*); (nylon); (head*). As shown in FIG. 2 each of these key terms 44 can be aligned along a respective portion of the horizontal or vertical axes to define the keyword grid 40. For each of the key phrases 44, the data retrieval element 18 may perform searches over the targeted databases 28 with these combinations. The resulting matches can be represented within the keyword grid 40 and then the system may perform analysis over the grid entries. For example, the system 10 may determine how many unique documents exist between two grid entries between the keyword 40, as many of the matches of both grid entries may be for the same document.

To this end, the data retrieval element 18 may include a keyword parser that can analyze the user query 42 to identify within the user query one or more keywords 44 that can be separated out of the query and employed for performing a keyword search over the targeted databases 28. In one embodiment, the keyword analysis tools used within the data retrieval element 18 comprise conventional analysis systems and specifically in one embodiment comprises, an expanded macro function. However, more sophisticated analysis systems may be employed without departing from the scope of the invention. Optionally, the data retrieval element 18 may include a weighting device that can determine and/or add appropriate statistical measures to the keyword searching process to achieve a higher level of intelligent data gathering. Other such modifications and additions may be made to the data retrieval element 18, and the actual operation of the element 18 will vary depending on the application. In either case, the design and development of the data retrieval element 18 follows from principles known in the art, including those described in McGovern et al., *A Guide To Sybase and SQL Server*, Addison-Wesley (1993).

Once the keyword grid 40 is formed by the data retrieval element 18, the data retrieval element 18 may conduct the various searches over the targeted databases 28. This is the data retrieval portion of the system 10. The targeted databases 28 may be supported by any suitable persistent data memory, such as a hard disk drive, RAID system, tape drive system, floppy diskette, or any other suitable system. The system 10 depicted in FIG. 1 includes databases that are shown as part of the data processing platform 12, but may in alternate embodiments, comprise remote, and/or distributed database systems. The working database 28 may comprise a standard Lotus Notes databases, CD-ROM databases, specially constructed databases (e.g. a proprietary research database), and WWW databases (web pages gathered from searches as well as the Web, or other Internet service in general).

In the case of a search over a targeted database 28 that comprises a patent database, these searches may result in several hundred or a few thousand patents that may have direct or indirect impact upon the case being studied. For example, a particular company may have 50 patents on DRAM memory and be concerned about (1) its competitors patent portfolios (could be several hundred); (2) its competitive position vis-á-vis those portfolios (relationships between the portfolios); or (3) how does it continue to position its new patents within the field. Standard keyword approaches would involve linear iterative searches focused around keyword strings; sets of documents containing these keywords will be selected for further study as the search process continues. The system 10, in one practice may first use the Keyword Grid approach that forms compound and complex keyword combinations and then automatically searches the databases 28. Secondly, the system 10 may use information within documents to interactively refine, and in some cases expand, searches. For example, in the patent example above, the Keyword Grid 40 will yield a matrix of document hits that satisfy various combinations of keyword strings 44. The system 10 can then find related documents that are connected to the matrix of documents by various fields or contexts specified by the operator (e.g. sister or offspring patent documents). In the end, the output of the data retrieval element 18 is a high quality working set, WS. Optionally, the system 10 may automatically allow the selection and creation of working sets resulting from 'new' documents that are found through successive searches. The creation of working sets may also apply for unreviewed documents.

Once the working set is obtained, the data correlation element 20 and the data connection element 22 operate on the WS to identify connections and relationships between documents. Both the data correlation element 20 and the data connection element 22 may be processes executing on the data processing platform 12, and can be processes that were written as C, C++, Java, Fortran, PERL, or other computer programs. The data correlation element 20 and the data connection element 22 may develop relationships between documents based upon: (1) fields whose contents contain references or pointers to other documents—these can be direct or indirect; (2) HTML links [hyper or hot links]; (3) contextual data within a document that can be developed into pointers or associations with other documents; (4) references that are generated through the use of intermediate documents, one example being a look-up table such as a dictionary or thesaurus; (5) groupings of documents based upon trend analyses that are performed, possibly in parallel, during an Infer trends operation, of the type commonly employed with data analysis systems and methods. The design and development of such processes, follows from principles known in the art, including those set forth in *The Art of Computer Programming: Fundamental Algorithms* (Vol 1, 3rd Ed), Donald Ervin Knuth, as well as other sources. Moreover, as will be discussed below, in one practice, the infer trend process comprises, at least in part, a visual analysis of a graphical depiction of the data elements in the working set, as well as at least some of the relationships between these data elements. Optionally, the correlation process provided by the data correlation element 20 may function in an iterative fashion, either with itself, or with another function; and (6) general reference established by association of content within one document and content of other documents, or groups of documents.

Figure 3:
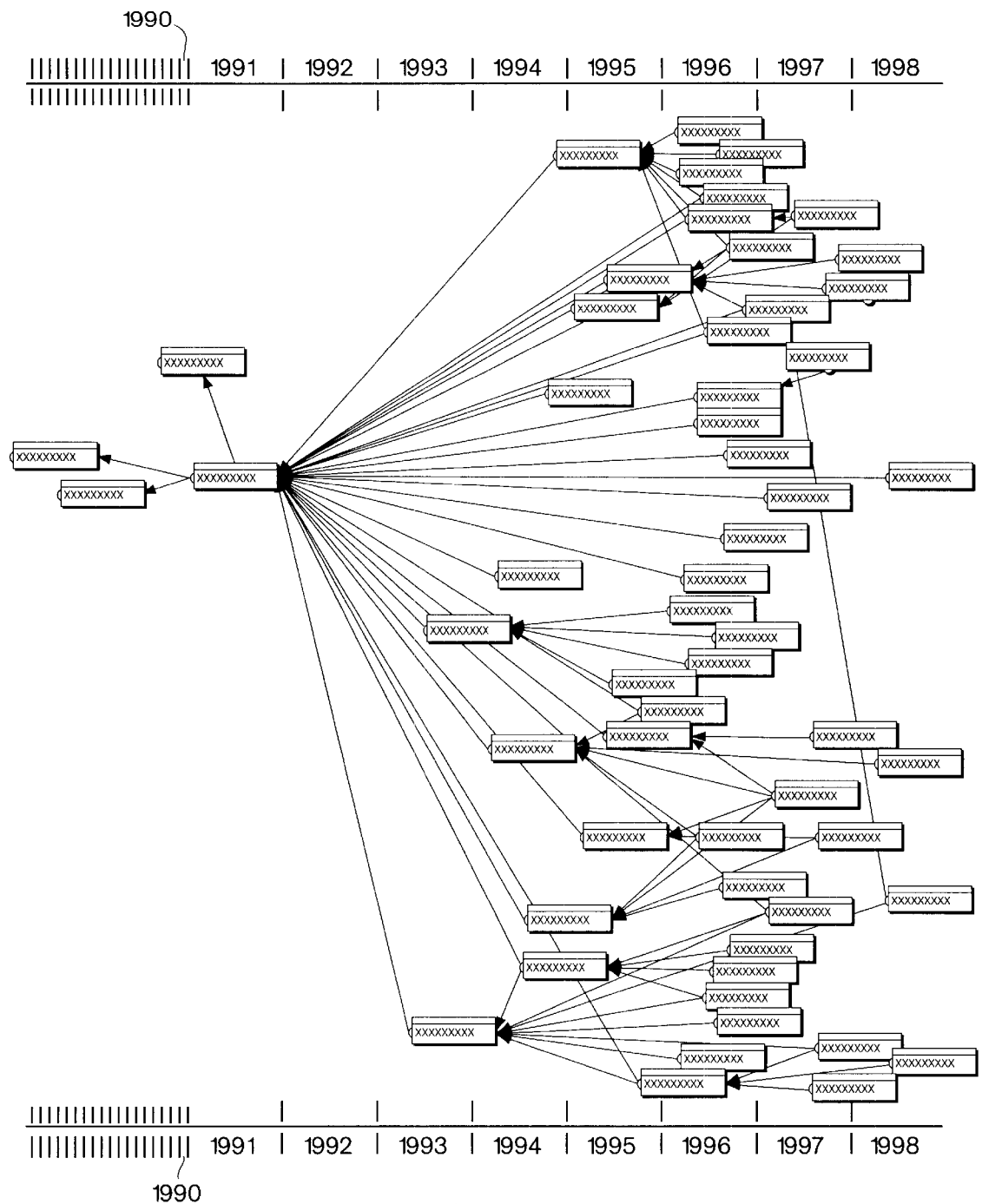
FIGS. 3 and 4 depict examples of a web for presenting data in the relationship between data in an organized graph.
Figure 4:
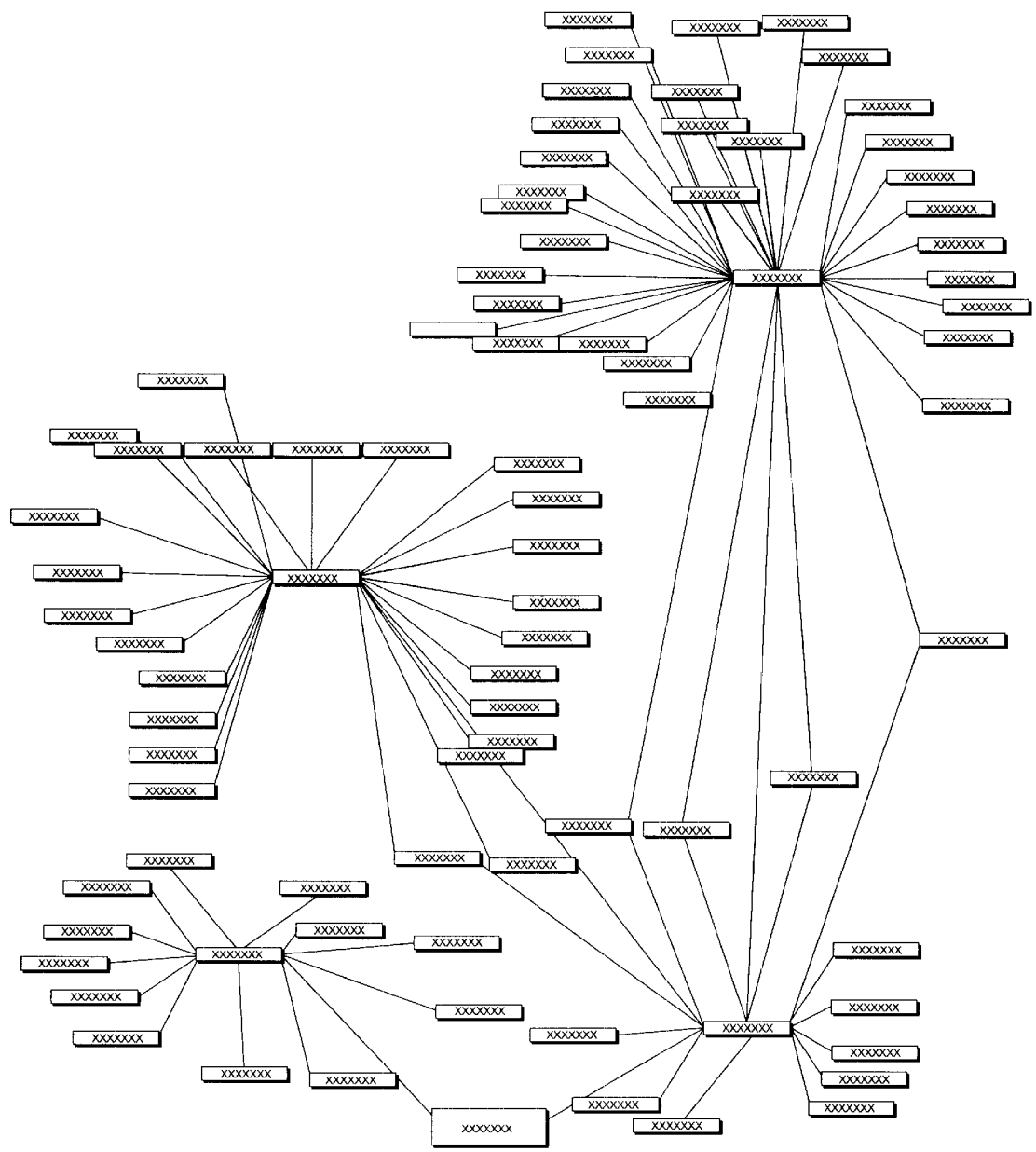

These relationships that were identified among the documents retrieved either from WS or from other system 10 databases and are represented as interconnected graphs, or Webs by the image generator 24 of the system 10. One such web is depicted in FIG. 3. Specifically, FIG. 3 depicts a web showing the relationships and connections related to the Batelle patent. As can be seen from FIG. 3, Batelle holds a key patent for Bar Code Readers. This Web indicates that Eastman Chemical, Xerox, Pitney Bowes and Angstrom Technologies are candidates to consider for potential licensing deals, following a thorough claims analysis.

Such Webs, the results of the data correlation element 20 and data connection element 22, exist in a construct termed a "plane" in the system 10. Within any one plane there may be several Webs that can be interconnected (Webs can be organized in a graph-like manner themselves) but all Webs within a plane will generally originate from one or more databases that are similar in content. Since there are many databases with different types of content in the system 10 (with more being added all the time) there are many potential planes. Webs may be interconnected between any two or more planes. Generally a Web will contain a single type of intra-connection selected from the various types of relationships defined previously. However, this use of a single type of intra-connect is not required; there may be cases where a mix of two or more types of intra-connects may be used. The results of a relate function are themselves part of a WS and can be fed into statistical analyses of additional find and relate functions.

It is the connections displayed in the Webs and in the groupings of Webs that leads to insights as to the character and inter-relationships of the data. For example converging connections implies some focus of attention that must be examined; frequency of occurrence of key organizations within a Web will yield some indicator of 'level of activity' and possible strategic implications vis-á-vis competitors, or even potential partners.

As the Webs are rich in visual information with distinct patterns, clusters, and anomalous data, they provide graphical depictions of data sets and the relationships between data sets that may be employed to infer trends readily. Some examples of information contained within Webs are given below: In the patent plane, a Web pattern of converging citation connections may imply a key blocking patent, a seminal patent, or a rich source of potential licensing revenue; Patents which have no forward references might imply a unique IP opportunity or conversely, no commercial viability; Many patents from a single organization that are concentrated in an area of a Web will lead to a thorough claims analysis of the connected group to determine if blocking positions are being taken by that organization; this, could be correlated with Webs to technical papers and business deals relevant to this position. These are but a few examples of trends that can be inferred from the data represented in Webs.

To generate the webs 30, the system 10 includes an image generator 24. To this end, the image generator 30 may be a computer process operating on the data processing platform 12, and capable of processing the working set data and the identified relationships and connections between different elements within the data set, to create a graphical depiction of the data. Additionally, the image generator 24 processes the data to organize the data elements in manner that allows the data to be depicted in an ordered and comprehendible manner. Processing of the data for creating a Web presentation may be accomplished both functionally and mathematically. On a functional level appropriate use may be made of colors, shapes, connector characteristics, non-linear axes, and Web ghosting within planes to help deduce meaning and relationships. Additionally, a mathematical model has been constructed and implemented that controls characteristics such as minimal visually-projected crossovers, intershape spacing, and interplane connectivities.

The webs 30 may be employed to identify trends in the data. Trends may be both graphical and statistical in nature. Once a Web has been generated, numerical statistics may be calculated and displayed to help in the analysis of Web data. Currently statistics can be grouped into the following categories: a) Summary statistics of specific fields over a Web. For example: The "top 10" occurring companies assigned patents, ranked in descending order, in this Web of patents; b) Comparative statistics such as charting one organization's Web data against another, or against a group of competitors. c) Time series of statistics (histograms) and comparative time series among groups of documents; and d) Cluster analysis over the Web data by various criteria such as frequency or connectivity.

In one embodiment, the image generator 24 processes the data elements in the working set and the connections and relations determined by the elements 20 and 22 to generate a graph of the working set. To this end, the linking structure among different pieces of information may be modeled as a graph and the processes described in Zhang et al., *Automatic Organization of A WEB Linking Graph*, (December 1997); and Bin Zhang, *An Intrinsic Hierarchical Structure in Any Undirectd Graph And Its Properties*, (October 1998) may be employed.

For these processes a node represents a web page, a page of flat text in hypertext, a scientific publication, a patent or a business identity. An edge (directed or undirected) represents a one-way or two-way relationship, like a link, a reference, etc. In addition to the mathematical definition of a graph, attributes, representing real world information, to the notes and links often exist. For example, the nodes could have different shapes and sizes or belong to different classes. In a preferred implementation, the process handles attributes. The locations of the nodes are to be determined. The process gives the coordinates of the nodes that optimize the layout in a comprehensible way (to be defined more precisely) and guarantees no overlapping of the nodes. The second requirement gives rise to a lot of constraints on the coordinates.

For certain applications, one of the coordinates is often better determined by an attribute of the node. For example, the time a patent was granted could be very important to the users and assigned to the X-axis's of the screen. In such cases, there will be only one coordinate left to be determined by the algorithm. For graphs of high complexity (large number of nodes, densely connected, or hierarchical relationship among nodes or links). 3D dynamic presentation can be used. The optimization algorithm in such situations could be required to determine three coordinates of a node. Among many different types of graph drawing standards—straight-line, polyline, orthogonal, etc—straight line drawing was chosen for its simplicity and drawing area efficiency.

Crossings of the edges are allowed. Disallow crossings will rule out many real-world situations in which the graph to be handled are not planar. Besides, there are often attributes to the nodes that are more important factors for deciding the coordinates of the nodes than reducing crossings. The time when a patent was granted is a good example. The (smallest) number of steps down the links to reach another web page from the current page could be another. M minimizing the number of crossings does not always give the best result.

For certain applications, one of the coordinates is often better determined by an attribute of the node. For example, the time a patent was granted could be very important to the users and assigned to the X-axis's of the screen. In such cases, there will be only one coordinate left to be determined by the algorithm. For graphs of high complexity (large number of nodes, densely connected, or hierarchical relationship among nodes or links), 3D dynamic presentation can be used. The optimization algorithm in such situations could be required to determine three coordinates of a node.

Among many different types of graph drawing standards—straight-line, polyline, orthogonal, etc—straight line drawing was chosen for its simplicity and drawing area efficiency. The algorithm handles any and all types of graphs. Planarity is not required. Crossings of the edges are allowed. Disallow crossings will rule out many real-world situations in which the graph to be handled is not planar. Besides, there are often attributes to the nodes that are more important factors for deciding the coordinates of the nodes than reducing crossings. The time when a patent was granted is a good example. The (smallest) number of steps down the links to reach another web plane from the current plane could be another. Minimizing the total length of the edges does not give the optimal either.

From our studies, we found that minimizing the length of edges under the constraint of no overlapping in general gives more appealing layouts. Edges on the screen take a lot of space especially when the number of edges is much larger than the number of nodes. Reducing the length of the edges significantly improve clarity. This optimization will automatically pull the related nodes closer to each other.

The algorithm developed depends on an intrinsic hierarchical structure of undirected graphs.

Let $G=(G, E)$ be a connected graph.

A cycle. $L=(L, E_1)$, $L \subseteq G$, $F_1 \subseteq E$, is a subgraph with the property that starting from any node in L, each edge and node has to be passed exactly once to come back to the starting point. For convenience, a single node is called a trivial cycle because there is no edges. The nodes in G and the edges in E are classified based on if they can be part of a non-trivial cycle. In the following definitions, the word "tree" can be explained by the fact that a connected graph is a (free) tree iff it has no cycle-edges.

Definition 1

Tree-nodes arc the nodes in G that is not part of any cycle in G, i.e. $G_T=\{n \in G \,|\, n \text{ is not part of my non-trivial cycle}\}$ is the set of tree-nodes. The remaining nodes are called cycle nodes $G_c=G-G_T$. Accordingly, the set of tree-edges, $E_r=\{e \in E \,|\, e \text{ is not part of any non-trivial cycle}.$ The remaining edges are called cycle-edges, $E_c=E-E_r$.

A subgraph is called a PCG-Subgraph (PCSG) if it is a PCG. A Maximal PCG-subgraph (MPCSG) is a PCG-subgraph that no more nodes or edges from G can be added to keep it a PCG.

In the art it is shown that any undirected graph is a tree of Pure-Cycle-Graphs of trees. A pure cycle graph is a graph that has no tree nodes and free edges. All the leaf-nodes in G are aggregated one by one until there is no more leaf-nodes in the final aggregation G. Then each maximal PCG is aggregated into a single node, which gives the top level tree T.

This hierarchy gives the natural partition of the undirected graph for a divide-and-conquer type of algorithm. A tree layout algorithm is developed and applied to both the lop level tree, T, and the little trees that hung out on the nodes in PCGs. A PCG layout algorithm was developed and applied to each individual PCG.

The tree-PCG-tree structure works well with any spanning tree of the original graph. This property has been used to traverse the tree-PCG-tree hierarchy.

The layout of a tree was done through depth first traversal, yielding a graph similar to FIG. 3. Subtrees are laid out before the parent so that the total size of the subtrees can be calculated when we assign coordinates to the parent. Special ordering of the children can make the layout more appealing. For example, in our implementation, children were sorted according to the size of their bounding boxes (both length and height). Layout was done symmetrically around the centerline of the parent for its compactness and symmetry. Gaps between children were minimized to save screen space. Bounding boxes of the subtrees which are needed for both calculating the coordinates or the parent and for PCG-subgraph layout (to be presented), were calculated recursively during the layout.

Setting up the total length of the edges as a performance function to be optimized under all non-overlapping constraints as a continuous variable optimization problem is not hard. But solving that problem is not easy because 1) the performance function is not linear (it could be converted to an equivalent linear in some special cases); 2) the constraints on the locations of the nodes are very complicated. If we draw those constraints as hyperplanes in the high dimensional space where the optimization problem is setup, we will find that the space is segmented into many disconnected regions. The real optimization is to find the region that contains the optimal (after restricted to this region, it becomes an optimization of a continuous variable function over a convex hull). Therefore, it is a discrete problem.

By introducing a sequential ordering of the nodes in a PCG, the problem was formulated to be in optimization over $S_n$, the permutation group of n elements. Sequential ordering is an artificial constraint introduced to simplify the problem. It also gives only a sub-optimal instead of the true optimal of the original problem. However, the results from this sub-optimal have been quit satisfactory. Further improvements based on this sub-optimal solution are possible and have been implemented.

Each node in the PCG takes the amount of space determined by its bounding box size, which was calculated during the layout of the sub-tree hanging out on the LN. Sequential ordering of the nodes with their bounding boxes non-overlapping ensures the non-overlapping of the nodes in G. The ordering that minimizes the total length of the edges in each PCG was found.

Exhaustive search over S is impossible except for very small problems because the size of $S_n$ is n!. The steepest decent idea from optimization of continuous variables is borrowed. Search is done in a local neighborhood of an element in $S_n$, and the best is chosen to be the next state. The process is repeated until a local minimum is found (we have no way to know if it is a global minimum without exhaustive search). To avoid being easily trapped in a local minimum, a larger neighborhood can be used for the local search in the steepest decent. The algorithm bas been implemented as a DLL in C on MS Windows platform. This DLL is called try applications developed in Visio Professional and Lotus Notes. The amount of time it took by the computational algorithm (the DLL) has been measured separately and presented here because the time required by drawing the nodes and edges on the screen was done in the application and it varies greatly depending on what graphics drawing (commercial) software is used.

Any undirected graph is a tree of PCGs, pure-cycle-graphs, of trees (Tree-PCG-Tree hierarchy). This hierarchy gives the natural partition of the undirected graph for a divide-and-conquer type of algorithms. A tree layout algorithm is developed and applied to both the top level tree and the little trees that hang out on the nodes in PCGs. A PCG layout algorithm was developed and applied to each individual PCG.

Those skilled in the art will know or be able to ascertain using no more than routine experimentation, many equivalents to the embodiments and practices described herein. For example, the systems described herein may include image generators that provide Webs as arbitrary connections of documents, even between planes which themselves represent different databases. This may be achieved as the mathematical models developed are extensible to n dimensions. In another example, the representation of patents connected within a plane, there could be multiple patent Webs, will use the same algorithms to represent connections to other planes (business news, technical journals, funding, government regulations, etc.). The same optimizations, spacing and display considerations will apply, generated from the same underlying processes. There will not be a separate 3-D model, or an n-dimensional model to handle cases where multiple planes are involved. It will also be understood that the systems described herein provide advantages over the prior art including improved ease of processing. Accordingly, it will be understood that the invention is not to be limited to the embodiments disclosed herein, but is to be understood from the following claims, which are to be interpreted as broadly as allowed under the law.

We claim:

1. A method for displaying and correlating data records in a visually comprehendible manner so as to effectively communicate relationships amongst data records comprising the steps of:
   A. defining the input parameters for searching, said input parameters being dependent on the data and descriptive of the fields in a data record,
   B. searching databases comprised of said data records using said input parameters as filters to identify associated data records,
   C. capturing associated data from said databases to create the working set containing a unique set of data records,
   D. augmenting the working set and performing additional processing to determine connections amongst the data records in the working set and other data records to identify relationships between the data records and the working set and bring to light additional information and knowledge that illustrate and infer relationships not readily apparent from the data records alone,
   E. presenting the combined and processed data records in an graphical fashion relative to a time axis to create an expanded display set depicting relationships indicated by connections which allow for communication of issues related to planning, assessment, and implementation, where said connectors are lines calculated and placed to minimize amount of crossing and length which connect the data records represented by a single geometric shape and wherein each shape is placed to minimize overlapping and total space required, where said time axis is scalable throughout the entire time range and independently scalable across and within multiple sub-time ranges and any of the various search parameters may be represented in a number of various methods by employing the use colors, shapes, and/or patterns allowing one to communicate additional information and further distinguish the display set.

2. A method as in claim 1 where statistics are performed on the expanded display set and the creation of user specified lists of any of the processed data records can be provided to augment the graphical display set.

3. A method as in claim 1 where providing the ability to alter the layout of the display set by sorting the display set by any of the input parameters.

4. A method as in claim 1 where the presentation of the expanded display set is dynamic such that additional information about a particular data record can be obtained by double clicking the shape to bring one directly to the original data source to enable viewing of additional information related to the data item in question.

5. A method in claim 4 where the user has the ability to direct the algorithm to the primary or any number of alternate data sources that may exist for the additional information.

6. Use of the method of claim 1 as a business process which allows for more effective and timely decision making and strategic planning when significant amounts of data and numerous complex relationships between the data are present where the F A represents Finding the data, the R represents Relating the data, where the I represents Infer trends.

7. A method for displaying and correlating patent data in a visually comprehendible manner so as to effectively communicate citation relationships amongst the patents, comprising A. defining the input parameters for searching, said input parameters being dependent on the fields typically found in a patent such as inventor, class/subclass, assignee, title, abstract, references, firm, filing date, issue date, keyword, B. searching patent databases comprised of patents using said input parameters as filters to identify associated patents, C. capturing patents from said patent database to create the working set containing a unique set of patents, D. augmenting the working set and performing additional processing to determine connections amongst the patents in the working set to other patents to identify relationships between all patents and the patents in the working set and bring to light additional information and knowledge that illustrate and infer relationships not readily apparent from the patents alone, E. presenting the combined and processed patents in an graphical fashion relative to a time axis to create an expanded display set depicting citation relationships indicated by connections which allow for communication of issues related to planning, assessment, and implementation, where said connectors are lines calculated and placed to minimize amount of crossing and length which connect the data records represented by a single geometric shape and wherein each shape is placed to minimize overlapping and total space required, where said time axis is scalable throughout the entire time range and independently scalable across and within multiple sub-time ranges and any of the various search parameters may be represented in a number of various methods by employing the use colors, shapes, and/or patterns allowing one to communicate additional information and further distinguish the display set.

8. A method as in claim 7 where secondary functional algorithms are run on the display set in order to determine areas for potential licensing opportunities, where said potential licensing opportunities are determined by a high degree of patents with the same assignee which reference similar art of another assignee which precedes in time the citing patents which are citing it and/or a high degree of similarity as determined by natural language searching amongst patents with different assignees which may or may not cite the patent which proceeds it.

9. A method as in claim 7 where secondary functional algorithms are run on the display set in order to determine areas for likely portfolio building, where said portfolio building is determined by a high degree of patents by a common assignee in a common class or similar field defined by keyword or natural language which share one or more connections indicating a relationship between the patents.

10. A method as in claim 7 where secondary functional algorithms are run on the display set in order to determine areas for potential seminal prior art, where said potential seminal prior art is characterized by an earlier in time patent which has an extremely large number of citing patents which reference the patent which itself has no or a limited number of references which it cites.

11. A method in claim 7 where the citation reference analysis is repeated for subsequent generations in either the forwards or backwards direction, where each generation is determined from the starting working set with the first set of patents which reference the working set of patents designated as the first generation and additional levels deeper named accordingly with the additional specification of forwards being defined as those patents which cite the working set patents while backwards is defined as those patents cited by the working set.

12. A method in claim 7 which utilizes an co-citation algorithm to calculate potential invalidating art which can be useful in countering alleged patent infringement where said co-citation algorithm evaluates the patent database and determines those patents which are not cited by, and share one or more similar citations to varying degrees with the alleged infringed upon patent where said varying degree can be specified by the user in order to determine the correlation desired or required.

13. A method as in claim 7 which tracks patents by inventor over time to identify movement of particularly prolific inventors and the entities they assign their patents to in order to be used for hiring practices and/or invalidating alleged patent infringement.

14. A method as in claim 7 which calculates all the connections/relationships of patents of one or more assignees to show the interconnections of a Assignee's patent estate and/or it relationship to other assignees which may be particularly useful in merger and acquisition strategies or for competitive intelligence.

15. A method as in claim 7 which is performed two or more times, each time substituting a different assignee or other variable keeping all other remaining variables the same in order to define the patent landscape of a particular field and present the additional dimension of seeing how that landscape is different for in the case of assignee each competitor analyzed or in the case of another variable relative to the fixed variable chosen.

16. A method where each database is comprised of unique domains similar in format, number and type of fields within the first domain, but are different in content and format relative to other domains, where all domains are readily searchable by using the same algorithm and employing database translators to determine the direct and indirect relationships amongst the data records of different domains and presenting these relationships both amongst and across all the domains where said database translators are capable of equating similar information which appears in dissimilar formats in each of the domains where each data record in a common domain is identified by a unique geometric shape; and where optimization routines are employed to allow for more effective pattern matching and visualization across databases or planes of "n" dimensions where "n" represents the number of planes or alternatively types of databases being analyzed and the effect of the optimization routine is to improve the visual representation of the complex interrelationships of multiple databases which allows for more inferences to be made and more effective mental interaction with the database, where each data record in a data base is represented as a node and each relationship or link is represented as a line(edge), and where each node location is determined by the algorithm where the algorithm ensures no overlapping of nodes and where each line can be directed, representing a one-way link or undirected, representing a two way link.

17. A method in claim 16 where one database is comprised of patent information and a second database is comprised of product information and may be combined with one or more other databases making the algorithm useful for strategic business planning, acquisition, investment and portfolio development.

18. A method as in claim 16 where the optimization is primarily mathematical in nature, where the mathematical representation of the data and its relationships consists of nodes (data records) which can be defined by its three coordinates, and an edge (line/relationships) which serve as connections between nodes, where the length of the edges are minimized which has the effect of pulling the nodes closer together but with the additional constraint of not overlapping the nodes resulting a more visually appealing representation of both the data and the relationships that exist resulting in a minimal amount of space to be utilized for the graphical display, minimal visually projected crossovers of the edges and optimal interplane connectivities.

19. A method as in claim 16, where the optimization is primarily visual/functional in nature and is utilized to enhance the usefulness of the data by allowing visual inferences to be more readily apparent, where clustering is utilized to combine data records with similar relationships both within a plane and across planes, where said clustering/combining of data records occurs based upon specified criteria such as frequency or connectivity, and colors, shapes, connector characteristics, non-linear axes is utilized to enhance the display and improve visualization.

20. A method for allowing access to the results of the method as specified in any one of the claims 1–19 over the internet and or other suitable electronic media to the clients that utilize the service, said method allowing secure access to the display set and which allows the client limited functionality in terms of viewing, displaying and printing the display set and associated lists.

* * * * *